United States Patent [19]

Unkenholz

[11] 4,429,180
[45] Jan. 31, 1984

[54] APPARATUS FOR SIMULTANEOUS GENERATION OF KEY AT TWO LOCATIONS

[75] Inventor: Willard C. Unkenholz, Silver Spring, Md.

[73] Assignee: The United States of America as represented by the Director of the National Security Agency, Ft. George G. Meade, Md.

[21] Appl. No.: 153,984

[22] Filed: May 19, 1980

[51] Int. Cl.³ .......................... H04L 9/00; H04K 1/00
[52] U.S. Cl. ............................. 178/22.17; 178/22.14
[58] Field of Search ............... 178/22.01, 22.02, 22.12, 178/22.13, 22.14, 22.17, 22.18, 22.19, 1, 86, 79, 80; 370/100, 103, 108; 375/106–110, 117

[56] References Cited

U.S. PATENT DOCUMENTS

| | | |
|---|---|---|
| 3,711,645 | 1/1973 | Ehrat . |
| 3,784,743 | 1/1974 | Schroeder . |
| 3,852,534 | 12/1974 | Tilk . |
| 4,079,195 | 3/1978 | Frutiger . |
| 4,091,423 | 5/1978 | Branscome . |

*Primary Examiner*—Sal Cangialosi
*Attorney, Agent, or Firm*—Thomas O. Maser; John R. Utermohle

[57] ABSTRACT

An apparatus for simultaneously generating identical cipher key at two remote terminals in a manner which prohibits interception of the key by unauthorized persons. A circuit comprising three separate wire lines is connected between the two terminals over geographically separated routes. The circuit is randomly completed and broken by a switch at each terminal, the switch position being determined at each terminal by an independent key generator. Cipher key is communicated by comparing the key generator output and the circuit condition.

8 Claims, 1 Drawing Figure

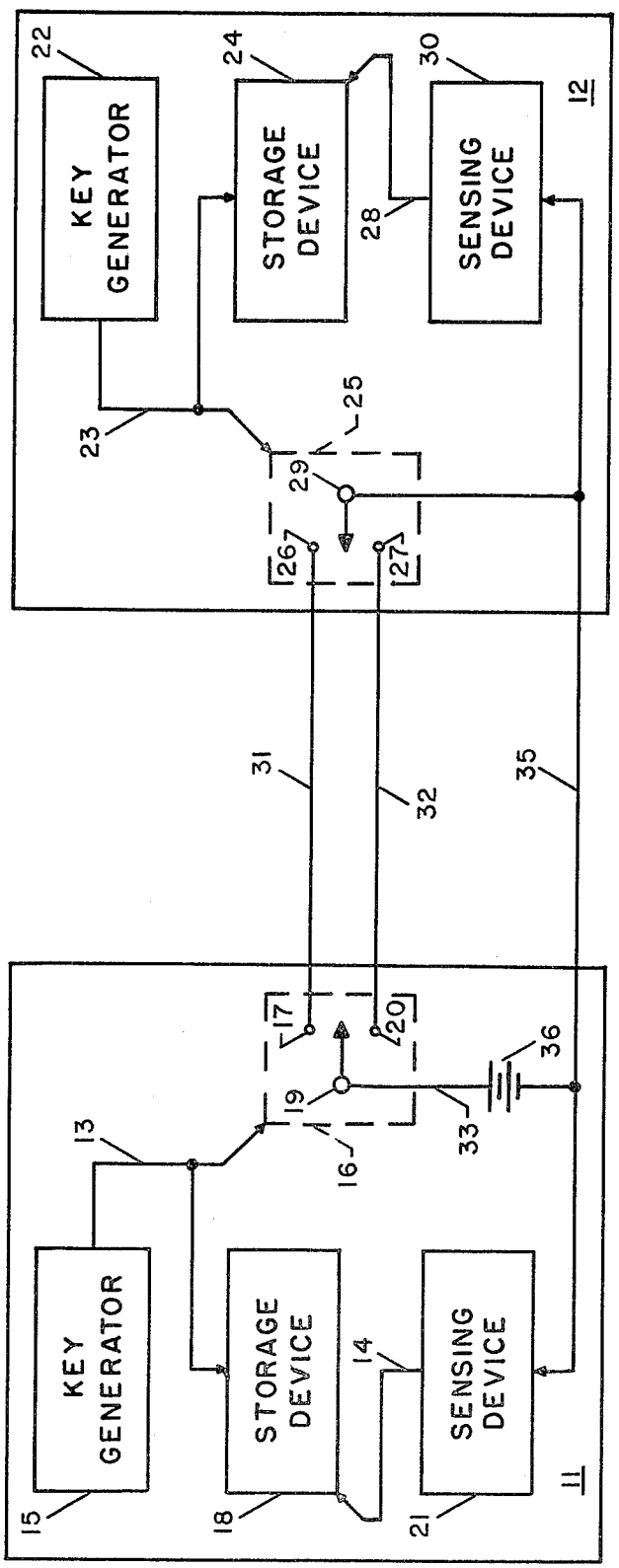

APPARATUS FOR SIMULTANEOUS GENERATION OF KEY AT TWO LOCATIONS

BACKGROUND OF THE INVENTION

1. Field of the Invention

This invention relates to the field of electronic communication, and more specifically to secure communication between remote terminals via wire lines.

2. Description of the Prior Art

The encryption of electrically transmitted messages has long been considered important for many military, diplomatic and business situations. As a result, many types of enciphering devices are presently known, most of which utilize some type of key for converting the message into an encoded form. The source for the key may range in complexity from a simple codebook to a highly sophisticated deterministic key generator. A feature common to all known encryption systems is the necessity that each terminal in the communication link possess a common key in the form of a one-time pad, an initial key generator setting, or some similar commonly held starting point. Secure communication is thus complicated by the need to manually transfer, store and protect the key prior to its use in communication. Prior art key generators are further complicated by a need for precise synchronization of identical devices at each terminal, and by the requirement that key be provided in a manner determined by complex crypto-mathematical algorithms.

It is desirable to simultaneously, at two remote terminals, generate identical key suitable for protecting communications transmitted between the two terminals without the prior physical or electrical transmission of key variables between them and without the use of complex crypto-mathematical algorithms at either terminal.

SUMMARY OF THE INVENTION

It is an object of this invention to simultaneously generate identical key at two remote terminals without the physical or electrical transmission of key variables between them.

It is a further object to accomplish the above without the use of crypto-mathematical algorithms at either terminal.

Another object is to facilitate secure communications over a wire line communications link.

It is a still further object to generate a common key by utilizing separate, nondeterministic sources, (e.g. noise) at each terminal.

It is also an object to communicate by wire link utilizing current flow detection rather than signal transmission.

A secure communications system possessing these and other advantages would include a pair of terminals located remote from each other, each terminal having an independent key generator; a circuit connecting said terminals; switching means at each terminal controlled by that terminal's key generator for opening and closing said circuit; and means at each terminal for sensing whether said circuit is opened or closed.

BRIEF DESCRIPTION OF THE DRAWINGS

My invention may be best understood by reading the specification in connection with the single drawing, which illustrates a secure wire line communications link utilizing the features of my invention.

DESCRIPTION OF THE PREFERRED EMBODIMENT

The FIGURE illustrates a pair of terminals 11 and 12 which are at geographically separated locations and between which it is desired to communicate a common cipher key. Terminal 11 includes a key generator 15 connected by line 13 to a switch 16 and to a storage device 18. An electrical sensing device 21 is connected by a line 14 to storage device 18. Switch 16 includes a common contact 19 which may be connected to a first contact 17 or a second contact 20. Terminal 12 is substantially identical to terminal 11, with a key generator 22 connected by line 23 to a switch 25 and a storage device 24. An electrical sensing device 30 is connected by line 28 to storage device 24. Switch 25 includes a common contact 29 which may be connected to a first contact 26 or a second contact 27.

Three wire lines connect terminals 11 and 12. A line 31 joins contact 17 in terminal 11 to contact 26 in terminal 12. A similar line 32 joins contact 20 to contact 27. A common line 35 between the two terminals joins the common switch contact 29 to sensing devices 30 and 21, and one post of a battery 36. The other post of battery 36 is connected to common contact 19 of switch 16 by line 33.

It is apparent from the FIGURE that when switch 16 is set to contact 17 and switch 25 is set to contact 26, a closed circuit exists through lines 31 and 35. Similarly, when switch 16 is set to contact 20 and switch 25 is set to contact 27, a closed circuit is made through lines 32 and 35. It is further apparent that no closed circuit exists between the two terminals when switch 16 is set to contact 17 at the same time that switch 25 is set to contact 27, or when switch 16 is set to contact 20 at the same time that switch 25 is set to contact 26.

Each of the switches 16 and 25 may be either mechanical of electronic, it only being necessary that the switch position be controllable by an electrical signal from the local key generator. A simple solenoid could meet this purpose. The key generators 15 and 22 may be any device capable of generating a binary signal, including a deterministic key generator, a non-deterministic noise source or even a binary source of information to be communicated.

Key generator 15 controls the position of switch 16 by means of the binary signal on line 13. For purposes of description, it will be assumed that a binary "1" on line 13 will cause a connection between contacts 17 and 19, while a binary "0" will connect contacts 19 and 20. Key generator 22 provides a binary signal to switch 25, causing a binary "0" on line 23 to result in the connection of contacts 26 and 29, and a binary "1" to connect contacts 27 and 29. The key generators 15 and 22 must be synchronized to the extent that they produce binary streams at an identical time and rate; however, it is neither necessary nor desirable that they produce identical output streams. It is also unnecessary for the two generated streams to be produced by a known algorithm or to be in any way predictable at either terminal.

The random binary stream from each key generator will cause switches 16 and 25 to shift back and forth as indicated above with one of four possible results. When the signal on line 13 is "0" and the signal on line 23 is "1", switch 16 will move to contact 20 as switch 25 connects with contact 27. A closed circuit is thereby created between the two terminals via lines 32 and 35. When the signal on line 13 is "1" and the signal on line 23 is "0", a closed circuit will be made with lines 31 and 35. The circuit is open, however, whenever the signals on lines 13 and 23 are the same, for a "1" positions the switches to contacts 17 and 27 while a common "0" positions the switches to contacts 20 and 26.

Sensing devices 21 and 30 continuously monitor line 35 for the presence or absence of a closed circuit. Sensing could be accomplished by a number of commonly known devices, such as an inductive pickup to detect current flow from battery 36 inserted anywhere within the closed circuit. An operator at either terminal who has access to the signal produced by his own key generator may accurately recreate the signal produced by the other key generator by continuously looking for the presence or absence of a closed circuit between the terminals. For example, if the signal on line 13 is "1" and a closed circuit is detected by sensor 21, the observer at terminal 11 knows the simultaneously produced signal on line 23 must be "0". If the signal on line 13 is "0" and a closed circuit is detected by sensor 21, the signal on line 23 must be a "1". The absence of a closed circuit necessarily means that the signals on lines 13 and 23 are identical.

It is of course possible that a person who understands the operation of my invention could simultaneously monitor both of the lines 31 and 32 at a point anywhere between the terminals to detect the occurrance of a closed circuit. This information could be made more difficult to obtain by separately routing the lines 31 and 32 between the terminals, but little real security would be achieved by mere physical separation of the lines alone. As a result, it should be assumed that he could obtain the key generator outputs at those times when the signals on lines 13 and 23 are complementary. However, no information whatever is conveyed to him by an open circuit on both lines; the knowledge that both key generator outputs are identical is useless without some basis for predicting either one or the other.

The security of my invention thus lies in limiting useable key to those key generator outputs occuring simultaneously with the absence of a detected closed circuit between the terminals, i.e., when the key generator outputs are identical. This may be easily done by activating the data storage devices 18 and 24 by the sensors 21 and 30, respectively, to receive the key generator signals upon detection of the absence of a complete circuit. In this way, identical binary streams are recorded at each terminal which may be subsequently used as key in any conventional manner. The storage devices could be a delay line, recorder, or similar common device capable of storing a binary electrical signal.

It is to be understood that the foregoing description is of a preferred embodiment for purposes of explaining my invention, and that numerous modifications are readily apparent. I therefore intend that my invention not be limited to the precise structure discribed, but that it also includes those equivalents encompassed by the appended claims.

I claim:

1. An apparatus, comprising:
   a pair of terminals located remote from each other, each terminal having a key generator which produces an independent but synchronized binary output;
   a circuit connecting said terminals;
   switching means at each terminal controlled by that terminal's key generator for opening said circuit only when the output of both key generators are identical, and closing said circuit only when the output of both key generators are not identical; and
   means at each terminal for sensing whether said circuit is opened or closed.

2. The apparatus of claim 1, wherein said circuit comprises:
   a common line connected between said terminals, and
   a pair of lines between said terminals which may be selectively connected to said common line by said switching means.

3. The apparatus of claim 1 or 2 wherein said circuit includes means for generating an electric current when the circuit is closed.

4. The apparatus of claim 3 wherein said sensing means is a current sensing means.

5. The apparatus of claim 1 wherein each terminal further comprises means controlled by said sensor for selectively storing the output of said key generator.

6. The apparatus of claim 1 wherein each of said key generators is a random key generator.

7. The apparatus of claim 5 wherein said means is a recorder.

8. The apparatus of claim 5 wherein said storage means further comprises means for storing the output of the key generator only when the sensing means detects an open circuit.

* * * * *